United States Patent Office 3,145,079
Patented Aug. 18, 1964

3,145,079
PROCESS FOR THE PREPARATION OF PURIFIED HYDROGEN BROMIDE GAS BY THE USE OF ACTIVATED CARBON AS CATALYST
Max L. Harbaugh, New Shrewsbury, N.J., assignor to E. I. du Pont de Nemours and Company, Wilmington, Del., a corporation of Delaware
No Drawing. Filed Oct. 31, 1961, Ser. No. 148,805
1 Claim. (Cl. 23—154)

This invention relates to the preparation of hydrogen bromide.

Prior art processes of preparing hydrogen bromide gas by reducing bromine with sulfur in the presence of water have been found to produce a gaseous product containing sulfurous impurities and unreacted bromine. These sulfurous impurities have not all been completely identified, but include various partially oxidized and volatile compounds of sulfur, oxygen and bromine, formed in the reduction process. These sulfurous impurities, upon adsorption in water and subsequent oxidation, are analyzed as sulfates. It is believed that among these impurities are sulfur dioxide and thionyl bromide ($SOBr_2$).

Prior art attempts to remove these sulfur impurities from the gaseous hydrogen bromide stream by dissolution in a solvent have not proved satisfactory since the method is costly and not sufficiently efficient.

According to the present invention, these impurities can be removed from gaseous hydrogen bromide which is made by reducing bromine with sulfur in the presence of water. The invention comprises the improvement of passing the impure hydrogen bromine gas through a carbon-packed bed or column, and then collecting the purified hydrogen bromide gas.

The constituency of the hydrogen bromide stream being purified will ordinarily comprise not more than about 2%, by weight, of sulfurous impurities, based on total sulfur present, not more than 2%, by weight, of bromine, and at least two moles of water for each mole of sulfurous impurity calculated as $SO_2$. These components should be present in stoichiometric proportions. Preparation of a hydrogen bromide stream of this constituency is described in detail below.

The carbon used according to the present invention is preferably that known as activated charcoal. The carbon apparently catalyzes a reaction in which the sulfurous impurities and certain bromine compounds in the hydrogen bromide gas stream react to form sulfuric acid and hydrobromic acid, with the result that the gas leaving the carbon is essentially all hydrogen bromide, containing only water vapor as an undesired component. Since the carbon is used as a catalyst rather than an adsorptive purifier, it can be used for extended periods without treatment to remove impurities.

The water content of the final product can be subsequently reduced to desired limits by any suitable means, such as by ordinary refrigeration, or by passing the product stream through a conventional cold trap operated, for example at reflux. An alternative drying method, such as the use of a conventional desiccant bed, can also be used.

The carbon used in the process of this invention can be located in any convenient vessel, most preferably in a column or tower bed in conventional equipment. The tower or column is preferably located immediately following the hydrogen bromide gas generator or reactor in such a manner that any drip back or condensate from the column is returned to the reactor.

With reference to an activated charcoal column operation, the inlet temperature of the column approaches the operating temperature of the hydrogen bromide gas generating reactor, which is within the range of 100° C. to 160° C. The heat effects in the column are negligible. Thus, a gradual progressive cooling due to natural radiation through walls to the atmosphere occurs during passage of the hydrogen bromide gas stream through the column so that outlet temperature can be as low as ambient atmospheric temperature or approach the inlet temperature, depending upon the volume of throughput. The inlet gas temperature may reasonably be about 100° C. to 135° C. with the appropriate temperature gradient through the length of the column. Ambient temperatures can range to as low as about 25° C. In general, the upper temperature of the carbon bed will not rise above the temperature of constant boiling hydrobromic acid, i.e., about 126° C.

The carbon bed is maintained essentially at atmospheric pressures, i.e., about 1 to 2 inches of water pressure. The pressure of the column is not a factor in this step. If preferred, it is only necessary to use sufficient pressure to promote the flow of gas through the column and through the subsequent equipment. In general, satisfactory inlet pressures of about 1 to 2 inches of water exclusive of the back pressure of subsequent adsorption equipment are suitable.

Column or tower design can be conventional. A column length over diameter ratio in the range of 1.5 to 2 is preferred. The design gas velocity is in the range of 0.5 foot per minute to 2.0 feet per minute. The gas flow rates per unit volume of packing range from about 0.2 to 1.0 cubic foot of gas per minute per cubic foot of packing. The gas residence time in reaction zone is in the range from about 1 to 10 minutes.

As stated above, the amount of water in the hydrogen bromide stream being purified should be at least 2 moles of water for each mole of sulfurous impurity calculated as $SO_2$. Above this limit, the water content can be permitted to vary over wide limits.

The maximum limit of water content is that at which is formed the equivalent constant boiling composition of hydrobromic acid, i.e., 48% HBr. In other words, the amount of water present should be less than 52 parts of water per 48 parts of hydrogen bromide. Otherwise, if the column or tower temperatures are less than the boiling point of constant boiling hydrobromic acid (about 126° C.), equivalent materials will condense and reflux back to the tower or column.

Since it is highly desirable according to this invention to produce an anhydrous gas as a final product, the amount of water permitted to go into the column or tower containing the carbon is preferably held towards the minimum by means of controlling the water feed to the system. The amount of water entering the system can conveniently be controlled by adjustment of the concentration of the sulfuric acid in the preparation of the hydrogen bromide, as will be explained more fully below.

The sulfuric acid which forms in the carbon bed as a result of the catalytic reaction of the residual bromine and sulfur compounds, collects on the surfaces of the carbon particles to form a condensate which drips back to the gas generating reactor as a reflux stream.

In general, the purified hydrogen bromide gas issuing from the carbon-packed bed contains not more than about 0.10 weight percent of sulfurous impurities and not more than about 0.10 weight percent of elemental bromine.

PREPARATION OF HYDROGEN BROMIDE

The hydrogen bromine gas stream which is treated with carbon according to the procedures of the present invention can as referred to above, be suitably prepared according to conventional procedures.

The impure hydrogen bromide gas is prepared in such a way that the gas contains stoichiometric quantities of sulfurous impurities and gaseous bromine, and water vapor. A suitable procedure involves stoichiometric feeds of sulfur and bromine to a reaction heel of sulfuric acid, maintained at a selected temperature and concentration, with the reaction occurring to form in major part hydrogen bromide and in lesser part to form volatile sulfur and bromine compounds. When equilibrium conditions have been established in the resultant reaction heel, surprisingly, the sulfur and bromine compounds which do volatilize to so in stoichiometric proportions, so that subsequent catalytical reaction to completion of these compounds produces hydrogen bromide as an end product which is essentially free of either impurity.

The sulfuric acid heel is initially preferably kept at a concentration of about 49%. By maintaining the concentration at about this level, by purposely adding water in an amount in excess of the stoichiometric amount required by the reaction, and by maintaining the mole ratio of feed water to sulfur at about 10:1, the build-up of a more concentrated sulfuric acid is avoided.

At the stated water-sulfur ratio of 10:1, the effluent sulfuric acid in the reaction pot will be found to stabilize at 47.5%. For most effective results in uniformity of hydrogen bromide gas generation, the sulfuric acid concentration should be held within the limits of 42.5% to 52.5%. Within the range of sulfuric acid concentration just indicated, and employing atmospheric pressure with a heel temperature in the range of from about 100° C. to 160° C., there is produced a controlled off-gas containing hydrogen bromide, water, unreacted elemental bromine, and the volatile sulfurous impurity compounds, all in the vapor phase.

The particular temperature used will be high enough to maintain an appreciable vapor pressure of water in the hydrogen bromide reactor off-gas to complete the reaction.

In an alternative method of introducing the reactants into this process, instead of feeding the bromine and sulfur as separate streams to a heel of sulfuric acid, the sulfur can first be dissolved in liquid bromine to produce a solution of sulfur monobromide in excess bromine. The resulting solution is added simultaneously with water to a heel of dilute sulfuric acid, employing the same respective preferred rates of addition as just mentioned, and the process otherwise remains the same.

The hydrogen bromide gas stream can then be treated with carbon according to the process of the present invention.

The invention will be further explained but is not intended to be limited by the following illustrative examples:

Example 1

A gaseous hydrogen bromide stream is prepared using a generator consisting of a 2-liter standard laboratory 4-necked reaction flash arranged with an agitator, dropping funnel, thermometer, and gas outlet. The gas outlet leads to a vertical column two inches in diameter by 25 inches high packed with activated charcoal, and arranged for reflux of any drip-back to the reaction flask. The effluent gas from the charcoal column is led to a low temperature condenser also arranged in reflux. The charcoal column inlet temperature is about 125° C. to 127° C. and the outlet temperature is essentially at room temperature due to radiation cooling. The column input pressure is about 1 inch of water pressure and the average residence time of the hydrogen bromide stream being treated in the charcoal column is about 1 minute.

Over a four-hour continuous operating period, the effluent gas from the activated charcoal column is bromine-free and contains only about 0.03% to about 0.12% sulfur compounds as sulfur dioxide, as contrasted to 1.25% free bromine and .95% sulfur compounds before carbon treatment. The product recovery is 98.7%.

Example 2

The process of Example 1 is repeated, conducting three intermittent runs for a total of 13.5 operating hours. In this over-all period, the effluent pure hydrogen bromide gas is bromine-free and contains only about 0.01% to about 0.09% sulfur dioxide. The chemical yield of bromine to hydrogen bromide is 96.4%. The chemical yield of sulfur to sulfuric acid is 100.4%. The weight of charcoal used is 286 grams. The total weight of bromine fed is 2,270 grams, equivalent to 168 grams per hour, and at a gas velocity of 2.5 feet per minute in the charcoal column. The mass velocity of the hydrogen bromide gas is 0.30 pounds per square foot per minute.

Example 3

The apparatus for this example includes an 80 gallon glass lined kettle, equipped with an anchor agitator, steam jacket, thermocouple, feed inlet and gas outlet. The gas outlet is connected in series to a glass lined tower packed with activated carbon, thence to a refrigerated glass condenser, and finally to a product take-off outlet. The carbon tower is two feet in diameter by four feet tall and contains 150 pounds of activated charcoal, with a total packed height of three feet.

A sulfur bromine solution is made up in an auxiliary agitated tank and the system is operated in an intermittent manner to saturate the charcoal with hydrogen bromide gas. The reaction heel in the kettle is approximately 30 gallons.

The agitator is started and the temperature of the reactor heel adjusted within the range of 110° C. to 120° C. A feed of a solution of sulfur in bromine is then started and continued uniformly for a period of 16 hours. The flow of generated hydrogen bromide gas commences within a few minutes after feed of raw material is started. Over the 16-hour period a total of 627 pounds of sulfur bromine solution is fed to the reactor from the auxiliary dissolving tank. The sulfur bromine solution contains 93.8% (588 pounds) bromine and 6.2% (39 pounds) sulfur.

The gas pressure at the carbon tower inlet is 0.5 to 8.0 inches of mercury, which constitutes the back-pressure of the carbon tower plus subsequent gas absorption equipment. The tower inlet temperature approximates reactor temperature of 110° C. to 120° C., with the tower outlet temperature in the range from 15° C. to 27° C. due to ambient cooling. The outlet gas from the condenser is controlled to 16° C. Tower residence time is 4–5 minutes. For the duration of the run, the product gas tests essentially free of sulfur dioxide and averages only about 0.10% bromine by weight. Conversion of bromine to HBr is 99.9%.

The invention claimed is:

In a process for the preparation of purified hydrogen bromide gas from an impure hydrogen bromide gas produced by the reduction of bromine with sulfur in the presence of water, said impure hydrogen bromide gas containing in addition to hydrogen bromide only stoichiometric quantities of
  (a) sulfurous impurities calculated as $SO_2$, and
  (b) free bromine,
and not less than 2 moles of water for each mole of said sulfurous impurity, the step comprising catalytically converting said sulfurous impurities and free bromine to $H_2SO_4$ and HBr by contacting said impure hydrogen bromide gas with activated carbon while maintaining a temperature from about 25° C. to 125° C.

References Cited in the file of this patent

UNITED STATES PATENTS

| | | |
|---|---|---|
| 2,196,246 | Brown et al. | Apr. 9, 1940 |
| 2,825,627 | Redniss et al. | Mar. 4, 1958 |

FOREIGN PATENTS

| | | |
|---|---|---|
| 248,738 | Great Britain | Sept. 23, 1926 |

OTHER REFERENCES

J. W. Mellor's "A Comprehensive Treatise on Inorganic and Theoretical Chem.," vol. 2, 1922 Ed., page 66, Longmans, Green & Co., N.Y.